United States Patent [19]

Richelli et al.

[11] 4,432,214

[45] Feb. 21, 1984

[54] DEVICE FOR INSERTION AND FEED OF PRODUCTS ON THE PLATES IN A HORIZONTAL PLATE FREEZER

[75] Inventors: Angelo Richelli; Guido Battistella, both of Brugherio, Italy

[73] Assignee: Samifi Babcock Samifi Internationale S.A., Paris, France

[21] Appl. No.: 294,561

[22] Filed: Aug. 19, 1981

Related U.S. Application Data

[63] Continuation of Ser. No. 167,111, Jul. 9, 1980, abandoned.

[30] Foreign Application Priority Data

Jul. 23, 1979 [FR] France .................................. 79 18968

[51] Int. Cl.³ ............................................... F25C 5/14

[52] U.S. Cl. ...................................... 62/341; 198/472; 414/152; 414/157

[58] Field of Search .................. 62/341; 414/152, 157; 198/472

[56] References Cited

U.S. PATENT DOCUMENTS

| | | | |
|---|---|---|---|
| 2,830,462 | 4/1958 | Vettese | 414/157 |
| 2,965,049 | 12/1960 | Royer | 414/157 |
| 3,603,269 | 9/1971 | Royer | 414/152 |
| 3,955,376 | 5/1976 | Makenitsky et al. | 62/341 |
| 4,202,436 | 5/1980 | Kristapovich et al. | 198/472 |

Primary Examiner—Ronald C. Capossela
Attorney, Agent, or Firm—Kendrick, Netter & Bennett

[57] ABSTRACT

This invention concerns a device for insertion and feed of products on the plates in a freezer, particularly to horizontal evaporating plate freezers.

6 Claims, 18 Drawing Figures

DEVICE FOR INSERTION AND FEED OF PRODUCTS ON THE PLATES IN A HORIZONTAL PLATE FREEZER

This is a continuation of application Ser. No. 167,111, filed July 9, 1980 now abandoned.

It should be particularly noted that it is each individual file or row that moves the other files or rows; in other terms, when a file or row is introduced, such a file or row by its introduction movement will move all of the other files or rows lying on the plane, and will move the same by some degree in connection with the introduction displacement of the considered file or row; thus, it is apparent that a file or row will exit from the unloading outlet. This movement or displacement is allowed by the prismatic shape of the packages.

A freezer could not be supplied or loaded as above described, where the packages were not of prismatic shape, with vertical walls transmitting the pusher thrust. Thus, there are packages of not rectangle parallelepiped shape, or more generally prismatic shape with side walls perpendicular to the base. For instance, there are packages of frusto-conical, frusto-pyramid shape, etc.

As apparent, the above described type of loading cannot be carried out with such packages since, should a file or row of products (such as troughs or small basins of frusto-conical, frusto-pyramid or round shape) exert a pushing action on a file or row previously set on the horizontal plane, a contact between vertical planar surfaces would not occur, but contacts between points and lines and in any case between more or less irregular surfaces, with resulting side skids, overlapping and possible squashings of the products. The impossibility of loading and sliding said containers of not prismatic shape on horizontal planes, is evidently cause of serious limitations in such machines, particularly considering that not prismatic containers are often used for product packaging.

It is the primary object of the present invention to overcome the above mentioned disadvantage, that is to provide means for the loading and feeding on the plates in horizontal plate freezers of products regardless of the shapes, as well as dimensions and materials, of the containers thereof.

A device according to the present invention for the insertion and feed of products on the plates in horizontal plate freezers and the like is essentially characterized by comprising a set of pushing elements, each of which have at least one simple or multiple U-shaped seating and is suitable to accomodate within the "U" space a file or row of products, so that the latter do not project to a minimum extent from said "U" space; whereby each element can urge on a horizontal plane both the file or row of products accommodated therein and the element preceding it on said plane, without the products accommodated within the considered element coming into contact with said element preceding it on the plane, means being provided for supplying the elements one by one to a loading station at the inlet to the machine, where the files or rows of products are formed, means for pushing each of the elements for some length on the horizontal plane in the machine, and means for withdrawing the elements exiting from the machine and moving them back to said loading station.

In order that these and further features of a device according to the present invention, as well as the advantages resulting therefrom, be more clearly understood, an unrestrictive exemplary embodiment of the device according to the invention will now be described with reference to the accompanying schematic drawings, in which.

A device according to the present invention essentially comprises in the considered embodiment an element designated as a whole at 4 and which is referred to as "intermediate" in the present description.

Said element or "intermediate" is essentially of "U"-shape and is made of a sufficiently rigid material, such as metal, plastics material or the like.

Actually, as it will be better explained hereinafter, a machine or freezer uses a number of said intermediates 4. The intermediate 4 is suitable to accommodate within the "U"-space or cavity a file or row of products or packages such as those shown at 3 (see, for example FIGS. 4 and 5).

Figures 4, 5:
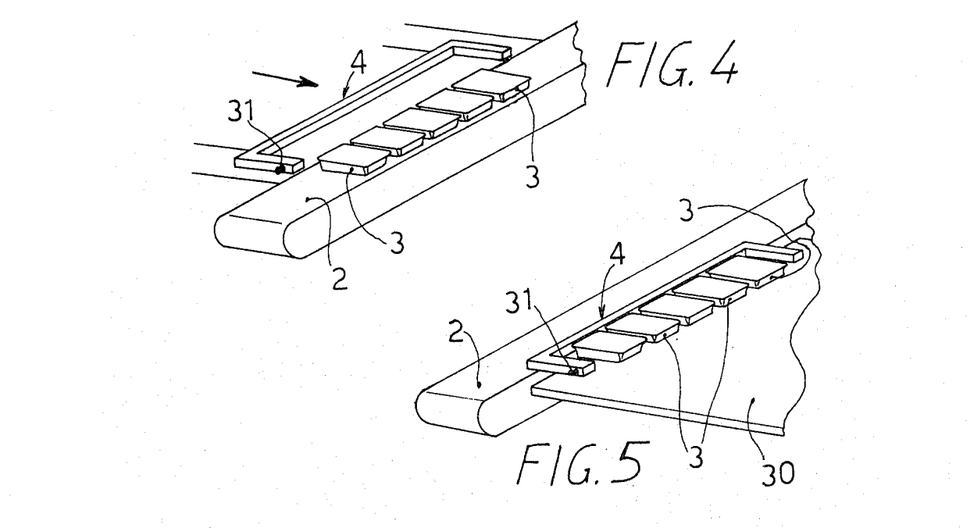
FIG. 4 is a perspective view of a detail, in which a "U"-shaped element is shown as it moves close to a file or row of products for withdrawal and insertion thereof in the freezer.
FIG. 5 is also a perspective view of said detail shown in FIG. 4, but at a next step, at which said "U"-shaped element has commenced to push said file or row of products.
Figures 6, 7, 8:
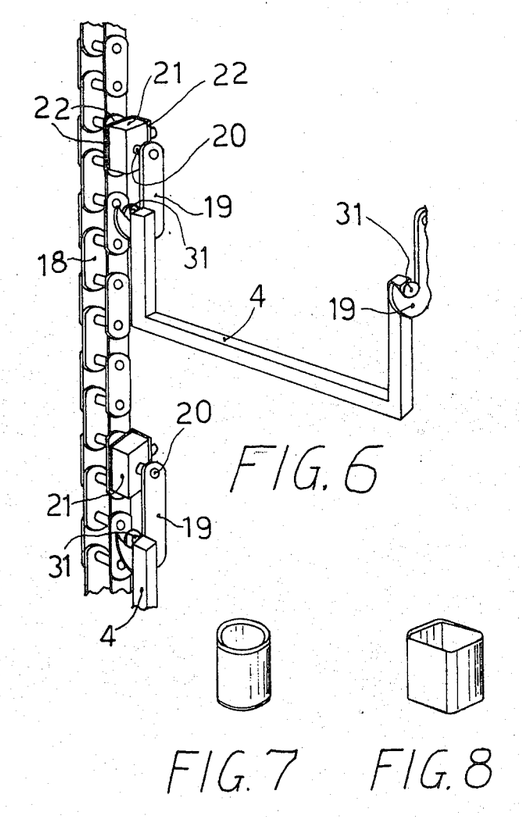
FIG. 6 is a view showing a detail comprising a chain for the transfer of the "U"-shaped elements.
FIGS. 7 to 13 are perspective view showing products containers.
Figure 9:
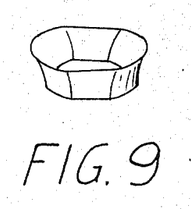
Figure 10:
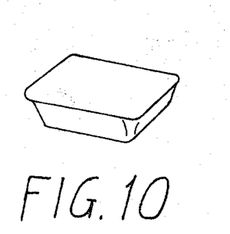
Figure 11:
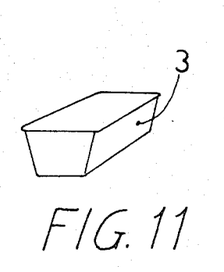
Figure 12:
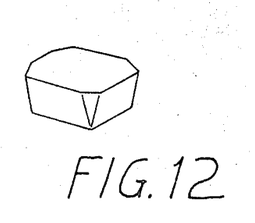

As it will be better explained in the following when describing the operation of the device, by moving under the action of suitable pushing means, each of intermediates 4 receive at some point a file or row of packages 3 as shown for example in FIG. 5, and push said file or row of packages on a horizontal plane 30.

Each intermediate 4, thus arriving on said plane carrying along a row of products, thereby pushes the intermediate that has previously reached said plane by means of the ends of the two parallel legs of the "U". By inserting one by one the intermediates with the respective rows of products on plane 30, the whole plane is thus loaded.

Should a new intermediate 4 with the corresponding row of products be inserted on a completely loaded plane 30, it is clearly apparent that this new intermediate will push the whole assembly of intermediates on the plane, so that an intermediate is unloaded at the opposite end of the plane.

In addition to said intermediates, a device according to the invention also comprises means for transporting said intermediates from the location of unloading thereof from plane 30 to the loading station, that is at the location where the intermediates are inserted on plane 30. The machine, to be hereinafter described, just comprises a device for carrying the intermediates back from the unloading station to the loading station.

Figure 1:
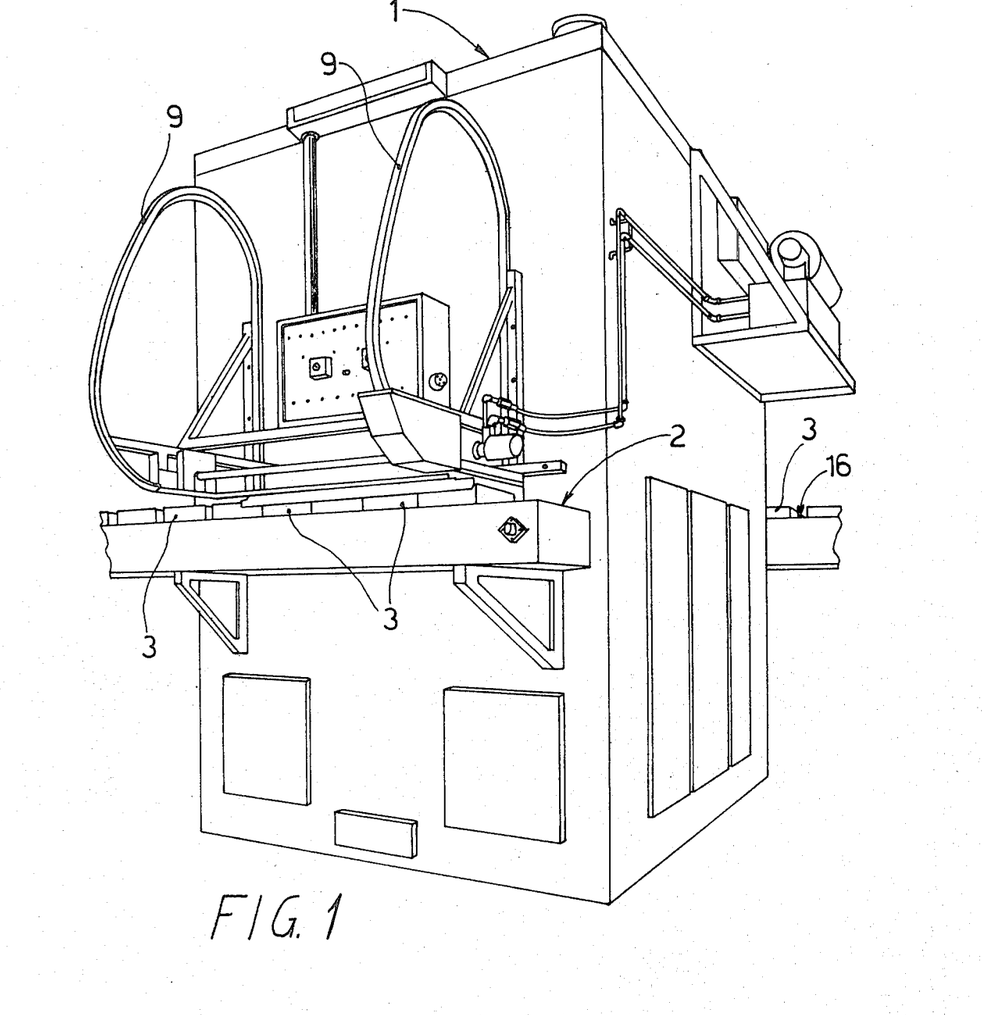
FIG. 1 is a perspective view of a freezer.
Figure 2:
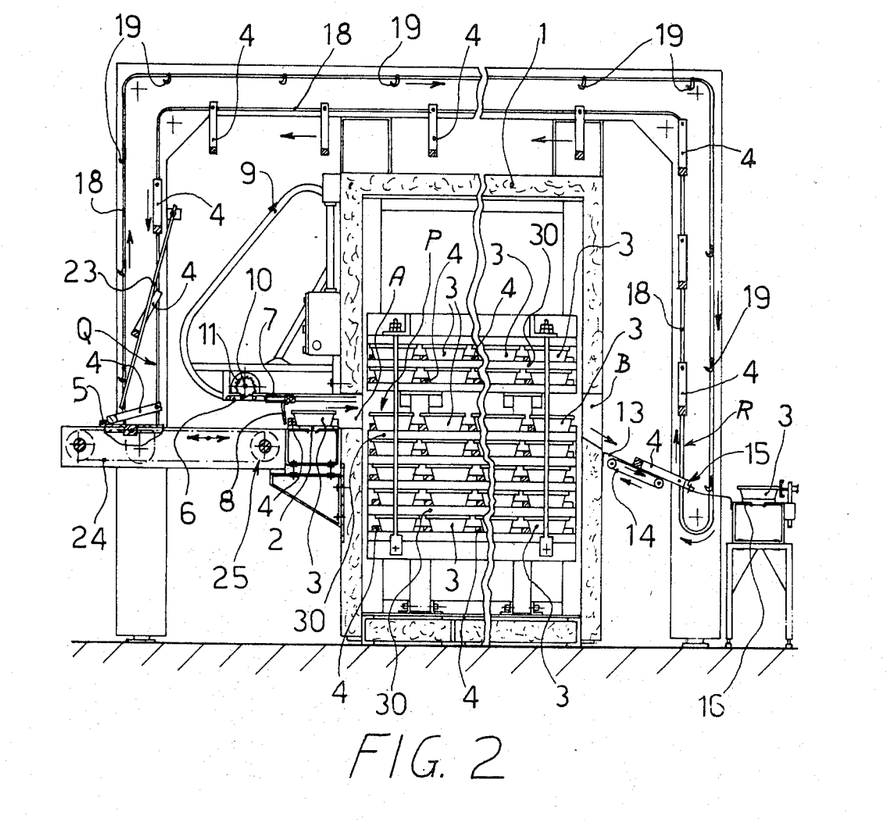
FIG. 2 is a vertical sectional view showing the freezer as fitted with a device according to the invention.
Figure 3:
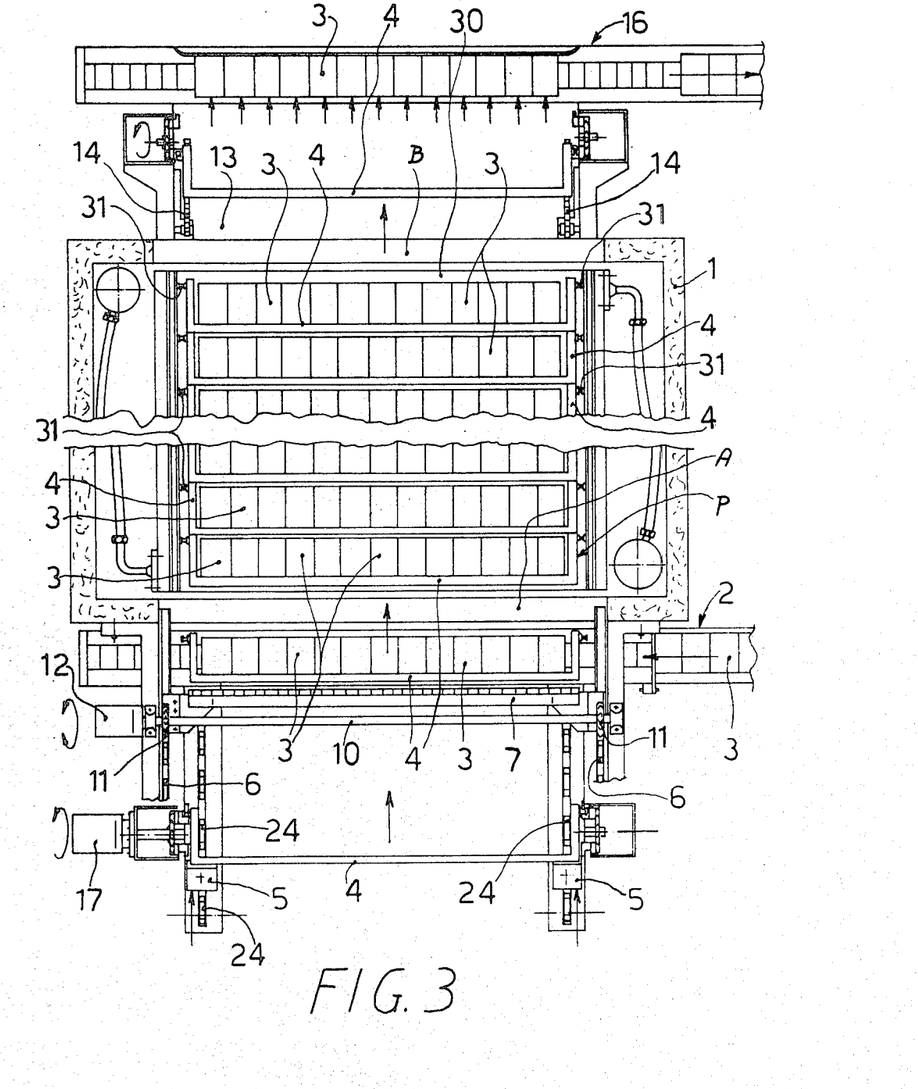
FIG. 3 is a horizontal sectional view showing the same device.

In the FIGS. 1, 2 and 3 of the accompanying drawings there is shown a horizontal evaporating plate freezer, that is a machine for freezing the products by taking advantage of the principle of cold transmission by double contact.

As shown in FIGS. 1, 2 and 3, such a machine comprises the device, or an exemplary embodiment of the device according to the present invention. The products to be frozen are accommodated within containers or small basins which, owing to the device according to the invention, may substantially be of any shape, such as frustro-conical, frusto-pyramid or cylindrical shape and the like.

Some examples of containers or small basins are shown in FIGS. 7 to 12, each of which just show a container.

Figure 13:
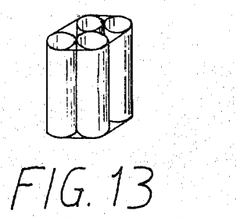

The products may also be assembled, so as to make up packages, as shown in FIG. 13, in which some containers are joined to one another, and retained together by suitable means.

The freezer shown in the above mentioned FIGS. 1, 2 and 3 for receiving products accommodated within containers (such as small basins) of the above mentioned design, comprises a cabinet designated at 1, within which a set is provided of horizontal (evaporating) plates designated at 30.

Since each of the plates have to be loaded with products, or containers accommodating the product to be frozen, and the plate has to transmit the cold to the products, each container preferably has a base comprising a planar surface of sufficient amplitude, designed for contact with plate 30 which has to yield the required refrigeration units to the container or small basin. However, the packages on plate 30 may also be of non planar base. Therefore, turning again to the above mentioned containers shown by way of example in FIGS. 7 to 13, obviously the side surface of each container may be of any shape, whereas generally but not always the lower surface or base of the container (such as a small basin) intended to bear on said plate 30 is planar and of sufficient amplitude.

Turning again to the freezer shown in FIGS. 1, 2 and 3, the set of plates or planes 30 is initially, or prior to commencement of machine loading by the products, is completely lowered, or is at the bottom of the freezer cabinet 1.

For loading, the first plate at the top is at some moment placed at a level corresponding to the inlet opening, or station at which the files or rows of products to be inserted in said cabinet are led one by one.

After loading a plate 30 with a set of product package files or rows, through the intermediates 4 as more particularly explained in the following, the loaded plate is raised and another arrives at said loading station and so on until the loading is completed for all of the plates 30 which accordingly will be at the top of the machine or cabinet 1.

Then, all of said plates are brought back to the bottom and the products loaded thereon will be retained within the freezer for a predetermined time.

Each of the plates are then moved back at said loading station and new rows of products are led thereon, by means of said intermediates 4 as better shown in the following, so that as each row of products reaches on the plate at the loading station, a row of products is expelled or leaves the plate at the unloading station.

In addition to the above mentioned intermediates 4, the device according to the invention comprises in the example shown in the accompanying drawings a conveyor essentially formed by a chain 18 carrying a series of hooks 19 which are secured to the chain at equal spacing from one another. More particularly, said chain 18 is slidable in a guide fixed with respect to the machine framework, so that this looped chain can move through a path such as, for example, that clearly shown in FIG. 2, or similar for the same purpose. Actually, two fully identical chains 18 are provided respectively on two parallel vertical planes at the two opposite sides of the machine.

Said chain 18 is suitable to transport the intermediates 4 and is particularly suitable to withdraw such intermediates 4 at the outlet opening B of the freezer and carry them to a position at the inlet opening A of the freezer, such positions being shown in FIGS. 2 and 3.

The file or row of products 3 to be inserted in the machine or cabinet 1 is built up adjacent said inlet opening A and particularly in front of the latter. More particularly, as shown in detail in FIG. 3, a belt conveyor is designated at 2 for carrying the products or packages 3 to the loading station, or in front of said inlet opening A.

Suitable atomatisms regulate the number and position of packages 3 which are stopped in front of said inlet opening A, forming a row of the desired length. Upstream of said station, where the row of products or packages 3 is formed, a translator device is provided for first leading the intermediate element 4 from the position at which such an element leaves said chain 18 (leftward position as seen from FIG. 2) to a position preceding said station where said row of products is formed. Said translator comprises two elements 5 for drawing the intermediate 4 and respectively carried by two similar chains 24 lying on parallel vertical planes, the chains being supported by supports fixed with the machine framework.

In FIG. 2 there is shown a looped chain 24, carried by two gears, the geometrical axes of which are integral with the machine framework. The two chains 24 are driven by a suitable motor.

The intermediate 4 is then led from the position preceding the row of packages 3, position to which it is led by said translator, to withdraw the row of packages and bring it into the plate 30 within the cabinet 1. Such a movement or displacement of this intermediate element 4 can be provided by the above described said translator device, comprising said elements 5 and suitably fitted with an adjustable stroke. However, in the present example a pre-existing loading device is provided as comprising two identical chains 6 respectively sliding in two guides 9 fixed with the machine framework.

Such a loading device comprises a horizontal bar 7 having a lug member 8 pivoted thereon, which is effective as a pusher designed to act upon the intermediate element 4.

The two chains 6 are respectively operated by two pinions 11 integral with a shaft 10 driven by a motor 12. When said chains 6 are operated for the insertion of the intermediate element 4 with the products in the cabinet 1, by moving from the left to the right (as seen in FIG. 2) said lug member 8 will act upon the intermediate element 4 which is thus fed in such a direction, withdrawing and drawing along the row of products, which thus passes through the inlet opening A, arriving on the plate which is at the level of said inlet opening. Externally of the cabinet 1 and at said outlet opening B a chute is provided, or substantially an inclined plane 13 for downward movement of the intermediate element 4 along with the products therein accommodated, said intermediate element exiting from said outlet opening B.

At said chute, a device 14 is provided for acting on the intermediate element 4 in order to increase the speed thereof as it downward moves along the chute. Downstream of the chute 13 a stop member 15 is provided, against which the intermediate element 4 is stopped.

In the present embodiment, the above mentioned hooks 19 are pivoted by means of pins 20 to small blocks 21 secured to square members 22 carried by said chain 18.

The operation of the above described device is substantially as follows.

Assuming initially that the freezer is empty, or that no products are present on plate 30, and assuming that said plates 30 are located at the bottom of cabinet 1. The loading operation is now to be effected, that is to say the operation for carrying the products or packages 3 on said plates 30. Through means not forming part of the present invention, the first top plate 30 is moved to the level corresponding to the inlet opening A, and accordingly to the outlet opening B.

The belt conveyor 2 having upstream of the machine said products or packages 3 placed thereon carries a first row of products to in front of said inlet opening A, that is to the loading station (shown in FIGS. 2 and 3). The row of products being formed at such a position includes a predetermined amount of products or packages 3 as in any suitable way determined. For example, the conveyor 2 will stepwise move through as many steps as the products 3 to be located at the loading opening.

Now, the row of products 3 to be inserted in the freezer or cabinet 1 is ready and stationary in front of said loading opening A.

Prior to formation of said row at said loading station, an intermediate element 4 has been led by the above described translator, comprising the chains 24 and pushing members 5, to the above mentioned position (slightly) preceding the station at which said row of products is being formed.

Following the formation of said row of products, the above described loading device is operated, this device comprising said chains 6 and said lug member or pusher 8, so that on moving to said loading opening A said pusher will encounter the intermediate element A which was preset at said position preceding the loading station and draws it by carrying it through the loading inlet A on said plate 30 prearranged at the level of the latter. At some point said pusher or lug member 8 will stop and move back, that is to say the rotation of motor 12 is inverted, so that said chains 6 travel through a return path. Thus, the intermediate element 4 is on said plate 30 just beyond the inlet opening A, at the position shown by P in FIGS. 2 and 3.

It clearly appears that the intermediate element 4 carried, as above mentioned, by pusher 8 on said plate 30, will draw along in its movement the row of containers or packages 3 which was in front of the inlet opening A and; accordingly, at the end of the above described operation will be on said plate 30 at said position P, shown in FIGS. 2 and 3, an intermediate element 4 with a row of products accommodated therein.

The same operations are repeated, that is to say a new row of products or packages 3 is formed in front of the inlet opening A and a new intermediate element 4 enters through the same above described means said cabinet 1 through said inlet opening A, arriving at said position P with a row of products 3 accomodated therein. Of course, on arriving at such a position the second intermediate element will push said first mentioned intermediate element.

By repeating the same operation for a number of times, the whole plate 30 being considered is filled up with such intermediate elements 4, each of which carrying along a row of products or packages within the space or cavity of said "U"-shape.

The length of the arms of the intermediate element 4, or of the two side legs of the "U" is considerably larger than the dimension of the product 3 in the feeding direction on plate 30, so that it clearly appears that each intermediate element sliding on the plate will push the preceding intermediate element by the two ends of said intermediate element arms. Therefore, said products or packages 3 do not exert any thrust on other bodies, or are merely drawn by said untermediate elements 4.

It will be appreciated from the foregoing that the thrust for the plate loading is exerted between the intermediate elements, and not between the products or packages.

Then, a plate 30 thus loaded is raised and a new plate arrives at the loading position, that is at the level of openings A and B, where in turn it will be loaded and so on.

Assume now that all of said plates 30 are loaded. Should a new intermediate element 4 with a row of products accommodated therein be inserted by the above described loading device on a plate 30 located at the level of the inlet and outlet openings A and B, loaded with intermediate element 4 with the respective rows of products, it is apparent that such an intermediate element, on arriving on plate 30 at said initial position P, will displace all of the intermediate elements present on said plate, and accordingly that intermediate element which is mearest the outlet opening B will leave the plate and exit from the freezer through said opening B.

The underside of the unloading or outlet opening B is also inclined (see FIG. 2) and promotes the supply or forwarding of the intermediate element 4 to the chute 13.

The intermediate element 4 along with the row of products or packages accomodated therein downward moves along the chute assisted by said device 14, which increases the speed thereof, and suddenly stops against said stop member 15 (particularly see FIG. 2).

On the other hand, the products or packages 3 accommodated in said intermediate element, will continue the travel thereof, thus reaching on a belt conveyor to the position 16, which will remove the frozen products from the machine.

As the intermediate elements 4 stops against said stop member 15, the chain 18 is caused to move.

For example, a microswitch is provided as associated with said stop member 15, on which the intermediate element 4 is effective just when the latter stops against the stop member. By means of said microswitch a signal is supplied to a motor 17, thus driving said chain 18, or both chains 18. The chain 18 (see FIG. 2) moves in the direction shown by the arrows, and therefore the leg designated by R at the right, as seen in said FIG. 2, upward moves.

Each of the intermediate elements 4 are respectively provided on the two side legs thereof with two pins 31, and accordingly two hooks 19 respectively pertaining to said two chains 18 will hook or connect the two pins 31 of that intermediate element 4 stopping agains said stop member 15.

The intermediate element 4 thus connected is raised by said length R of upward moving chain, or two chains 18. While at one side of the machine, or at the side of the unloading opening B an intermediate element 4 is withdrawn by the chain, at the opposite side of the machine, or at the side of the inlet or loading station an intermediate element 4 is carried by said chains 18 to the position at which said intermediate element will be withdrawn by said translator comprising the drawing members 5. At said zone there is provided an inclined guide, which is adjustable in position and designated at 23. More particularly two of such guides are provided adjacent the two chains, respectively. Said guide 23 serves the purpose of orienting the downward moving intermediate element 4 carried by the chain length Q, so as to present such an intermediate element at correct position on said translator.

At the left side of FIG. 2 the intermediate element is shown as presented to the translator at suitable drawing position, and this by translation as hanging from the chain and rotation due to guide 23, in contact of which said intermediate element is slidable. Now, suitable means such as, for example, a microswitch operated by the next intermediate element cause the chain to be stopped.

The same means causing the stop of chains 18 will start the translator, so that the drawing members 5 will draw the intermediate element 5 and carry it to the above mentioned position preceding by a short length the station at which the row of packages 3 is formed in front of the inlet opening A.

The above mentioned stop occurs after the intermediate element has come to bear on the translator and has been automatically cleared of the two hooks 19 of chains 18, the latter continuing the stroke or movement thereof for a short moment.

Being stationary at such a position, the intermediate element will not interfere with the packages 3 forming the row. After the intermediate element has stopped at said position, the row of products is formed, and then the loading device is operated, this device comprising said pusher 8 which draws the intermediate element, carrying it on said plate 30 through the inlet opening A to said position P. Thus, as above stated, all of the intermediate elements are displaced on plate 30 and therefore one of such intermediate elements passes through the outlet opening B, thereby sliding on said chute 13 to come to a stop agains said stop member 15.

The above described procedures are now repeated.

In order to start and terminate the movements for the above described various members, suitable means are provided in addition to those previously described.

Thus, for example, when the row of packages 3 has been completed in front of the inlet or loading opening A, a suitable device comprising a stroke counter, or a photoelectric cell or the like, causes the stop of package arrival and starts the loading bar fitted with pusher 8.

When the loading device comprising said pusher 8 forward moves, the same causes the retraction of the translator, or the drawing members 5 return to the position, as seen from the left of FIG. 2, for readiness to act upon the next intermediate element 4 downward moving as carried by said chain 18.

When the loading bar with pusher 8 has traveled through its standard path or stroke, a microswitch operated by a cam carried by chain 6 will stop the bar and cause the return thereof.

For complete loading of a plate there could be provided, for example, a stroke counter determining the desired number of insertions.

Of course, the whole matter above described with reference to the accompanying drawings is given by mere way of unrestrictive example.

Still within the scope of the present invention, many variations or changes can be made both in connection with the shape, dimensions and materials of the intermediate elements, and in connection with the means for driwing said elements.

Figure 14:
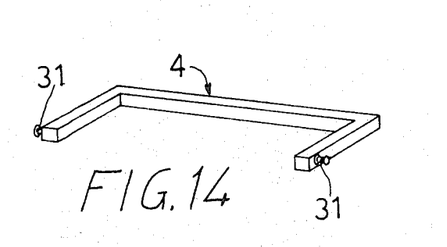
FIGS. 14, 15 and 16 are perspective views showing some pushing elements according to the present invention.
Figure 15:
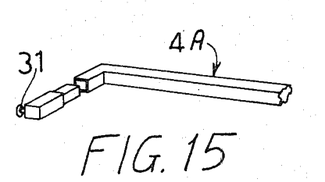
Figure 16:
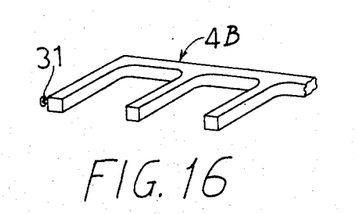

Some possible embodiments of the intermediate elements are shown in FIGS. 14, 15 and 16.

The intermediate element shown in FIG. 14 is substantially the same as that shown in FIGS. 2 and 3.

The intermediate element may be made of only one piece or in a plurality of parts which are interconnectable, for example it may be made with side arms of adjustable length, as the intermediate element 4A shown in FIG. 15. Particularly, by varying the lengths for the short sides of the intermediate element, several sets of intermediate elements for the translation of products of different dimensions may be provided for a same freezer, that is for always equal evaporating plates 30.

Figure 17:
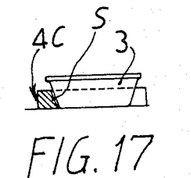
FIG. 17 is a sectional view showing a pushing element with a container (practically a row of containers) accomodated therein.
Figure 18:
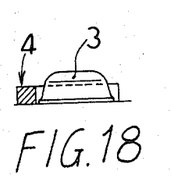
FIG. 18 is also a sectional view showing another pushing element with a container (practically a row containers) accommodated therein.

The intermediate element such as, for example, that shown at 4C in FIG. 17 may have an inclined surface S for better fitting the surface of the container 3 therein accomodated.

The intermediate element may be a simple element, as in the above described case or as shown in FIG. 14, or may also be a multiple element, that is substantially having a series of "U"'s, as that shown at 4B in FIG. 16.

In any case, for the translation of one type of package of given dimensions, an intermediate element is used, the housing or space of which has a larger dimension in the direction of the two side arms thereof than the corresponding dimension of the package in the same direction of the side arms of the intermediate element and this in order that, as above specified, the intermediate elements should exert a mutual pushing action, that is to say each intermediate element should push the next intermediate element on said plate 30 by means of the two ends of its side arms. Generally, the thickness of the intermediate element is lower than the height of the packages.

Many variations or changes may also be made to the translator, which in the above described exemplary embodiment comprises said chains 18 with hooks 19.

Particularly, the path travelled by the empty intermediate elements when moving from the unloading station to the loading station may be that as above described, which contemplates an excursion or passage over the freezer cabinet, but could also be a path contemplating a length laterally of or below the cabinet.

In order to dry the plates during dwells for cleaning and defrosting operations, the "U"-shaped intermediate elements 4 may be provided with drying members for cleaning the plate surfaces removing all of the water drops that may be formed due to washings and defrostings.

What I claim is:

1. An apparatus comprising a freezer including a plurality of vertically-movable horizontal plates, inlet means and outlet means on substantially the same plane within said freezer, and means for sequentially moving said horizontal plates to the inlet/outlet planes; a plurality of U-shaped pushing means, each pushing means having at least one seating area within its periphery; means for conveying said U-shaped pushing means to the surface of said horizontal plates through said freezer inlet with the legs of each U-shaped pushing means facing away from said freezer inlet, and means for conveying said pushing means away from said freezer outlet; said conveying means delivering said pushing means to the surface of each plate in sequence such that each succeeding pushing means delivered to the surface of said plate drives all pushing means ahead of it on said plate across said surface substantially exclusively through forces exerted by the pushing means, said conveying means carrying each of said U-shaped pushing means from said freezer outlet to said freezer inlet with substantially no frictional engagement between said freezer and said U-shaped pushing means and with no disengagement of said U-shaped pushing means from said conveying means at any point between said freezer outlet and said freezer inlet.

2. The apparatus of claim 1 further comprising means for engaging and conveying said pushing means from a location adjacent the freezer outlet to a location adjacent the freezer inlet, said engaging and conveying means including two chains in parallel vertical planes on opposite sides of the freezer inlet and outlet, said chains traveling through paths including the inlet and the outlet of said freezer, said chains conveying said U-shaped pushing means from said freezer outlet vertically upward and over said freezer, and then vertically downward to said freezer inlet, said apparatus further comprising means at the outlet of said freezer for separating said U-shaped pushing means from items carried within them as said U-shaped means engage means attached to said chains, and means for positioning a group of items in front of said inlet where said chains deliver said U-shaped pushing means so that said U-shaped pushing means can draw said group of items through said inlet of said freezer.

3. The apparatus of claim 1 or claim 2 further comprising means downstream of said outlet of said freezer for causing downward movement of said U-shaped pushing means as said U-shaped pushing means emerge from said outlet; means for stopping said downward movement of said pushing means and for disengagement said U-shaped pushing means from all items carried within said U-shaped pushing means at said outlet of said freezer, said stopping means cooperating with means for engaging projections from said U-shaped pushing means for engaging and carrying said U-shaped pushing means from said stop means to a position adjacent said inlet of said freezer.

4. The apparatus of 1 or claim 2 further comprising means adjacent said freezer inlet for imparting sliding movement to said U-shaped pushing means as said U-shaped pushing means disengage from the means for engaging and conveying said U-shaped pushing means to said freezer inlet, said means for imparting sliding movement also effecting orientation of said U-shaped pushing means to the proper position for engaging a plurality of items to be carried into said freezer.

5. The apparatus of claim 1 or claim 2 wherein at least one of said U-shaped pushing means includes means for dividing said U-shaped pushing means into at least two sections.

6. The apparatus of claim 1 or claim 2 wherein at least one of said U-shaped pushing means has an interior surface that is complementary with the shape of items to be carried within said U-shaped pushing means.

* * * * *